LINT COTTON CLEANER WITH BY-PASS
Original Filed Feb. 3, 1960 5 Sheets-Sheet 1
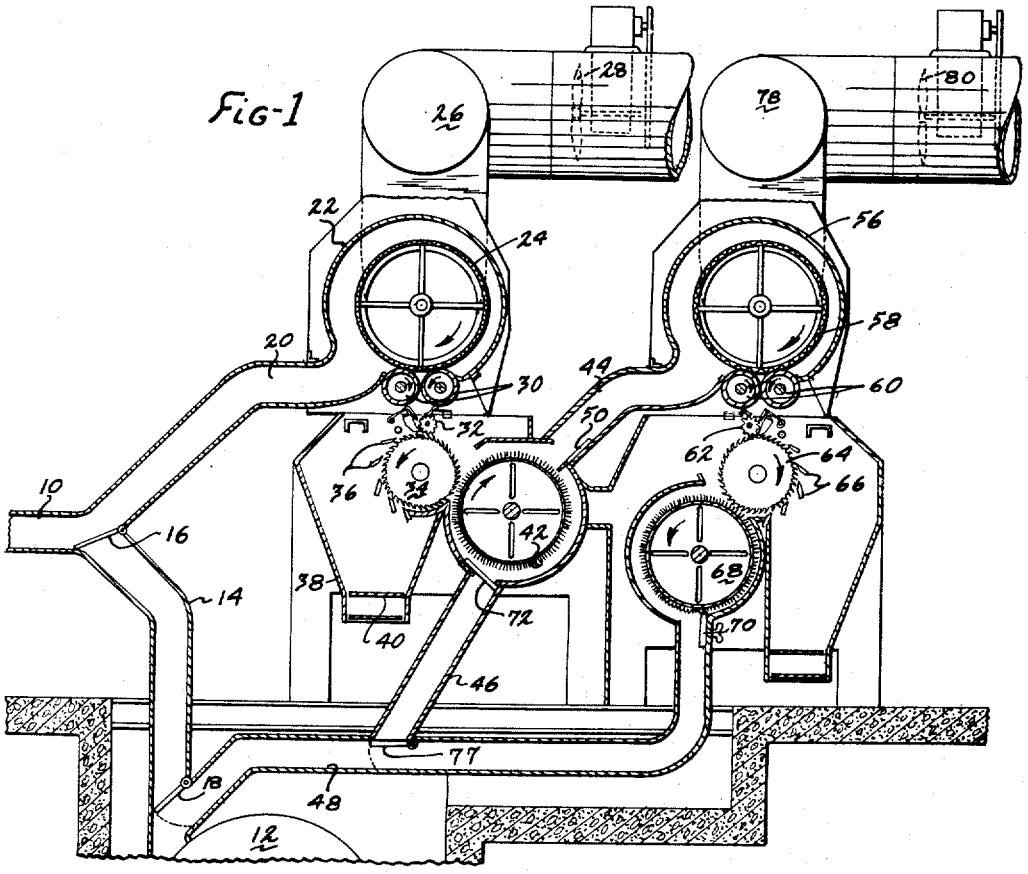
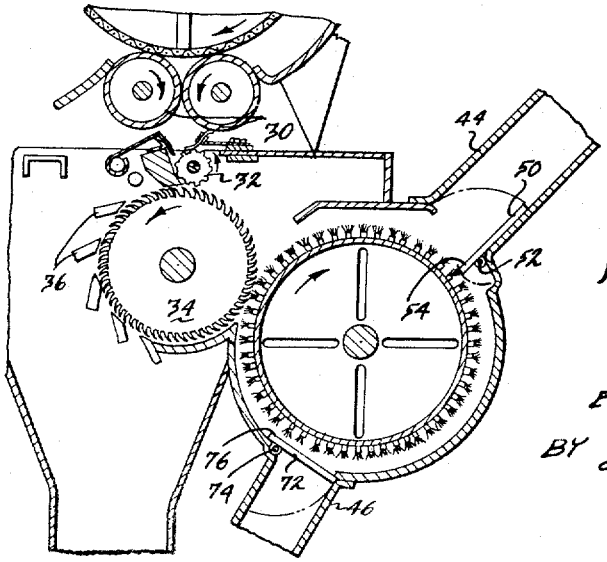
Fig-2
INVENTOR
EUGENE H. BROOKS
BY Toulmin & Toulmin
ATTORNEYS

LINT COTTON CLEANER WITH BY-PASS

Original Filed Feb. 3, 1960 5 Sheets-Sheet 2

INVENTOR.
EUGENE H. BROOKS
BY Toulmin & Toulmin
ATTORNEYS

LINT COTTON CLEANER WITH BY-PASS

Original Filed Feb. 3, 1960 5 Sheets-Sheet 3

INVENTOR.
EUGENE H. BROOKS
BY Toulmin & Toulmin
ATTORNEYS

LINT COTTON CLEANER WITH BY-PASS

Original Filed Feb. 3, 1960 5 Sheets-Sheet 4

INVENTOR.
EUGENE H. BROOKS
BY Toulmin & Toulmin
ATTORNEYS

LINT COTTON CLEANER WITH BY-PASS

Original Filed Feb. 3, 1960 5 Sheets-Sheet 5

INVENTOR.
EUGENE H. BROOKS
BY Toulmin & Toulmin
ATTORNEYS

United States Patent Office

Re. 25,780
Reissued May 18, 1965

25,780

LINT COTTON CLEANER WITH BY-PASS

Eugene H. Brooks, Sherman, Tex., assignor to Continental Gin Company, Birmingham, Ala., a corporation of Delaware Original No. 3,024,499, dated Mar. 13, 1962, Ser. No. 6,524, Feb. 3, 1960. Application for reissue Oct. 11, 1962, Ser. No. 230,798
14 Claims. (Cl. 19—203)

Matter enclosed in heavy brackets [ ] appears in the original patent but forms no part of this reissue specification; matter printed in italics indicates the additions made by reissue.

This invention relates to the cleaning of lint cotton and is particularly concerned with a structure wherein the lint cotton can selectively be passed through one or two cleaners. Still further, the present invention relates to an arrangement wherein double cleaning of lint cotton can be provided for in the extremely limited space that is usually available in existing ginning installations.

In the handling of cotton, most of the cotton that is ginned is cleaned prior to baling by passing it through a lint cleaner. Lint cleaners, which are well known, substantially improve the grade of the cotton by combing and smoothing the lint, by blending spots of varying density together, and particularly, by removing foreign matter such as dirt and leaf particles.

Cleaners of this nature have been successful and improve the grade of the cotton so much that there is a steadily increasing demand for double cleaning arrangements so that the lint cotton is substantially completely free of foreign matter and is particularly well blended together. The provision of double lint cleaning, however, presents a severe problem in most existing gin installations on account of the lack of sufficient space for the secondary cleaners and the ducts required to convey the cotton to and from the secondary cleaners and the suction means that must be applied to the condensers therefore.

Even when double cleaners are provided for the lint cotton, there are many occasions when it is not necessary to run the lint cotton through both the cleaners. When the cotton is fairly clean, a single lint cleaner is sufficient to bring the cotton up to the grade desired and it is only the trashiest cotton that must be cleaned twice. It is preferable for the lint cotton to be cleaned only a single time, if this is suitable, because double cleaning is apt to "overwork" the lint cotton and this tends to shorten and "nep" the fiber and to cause extra waste by breaking of the fibers and by the loss of the short fibers during the cleaning operation.

Accordingly, even when double lint cleaning structures are provided, it is most desirable to be able to by-pass one of the cleaners and divert the lint cotton from the first cleaner to the main lint flue. While, in general, the double lint cleaning of cotton is known, as well as the by-passing of the second cleaner in a double lint cleaning arrangement, it has not heretofore been possible to install double lint cleaning in most existing ginning installations on account of the lack of space.

Accordingly, a primary object of the present invention is the provision of a novel double lint cotton cleaner structure which is adapted for being installed in the limited amount of space that is many times available in ginning establishments.

A still further object of this invention is to provide a double lint cotton cleaner structure utilizing novel by-pass valves which are adjustable for controlling the flow of the lint cotton through the double cleaner.

A still further object of this invention is the provision of an extremely compact double lint cotton cleaner structure adapted not only for new installations, but for being placed in existing installations.

A still further object of this invention is the provision of a double lint cotton cleaner structure adapted for being used with a battery of gins or with a single gin, the structure of the cleaner being such that it needs merely be enlarged to accommodate more gins.

The foregoing objects of this invention as well as still other objectives and advantages thereof will become more apparent upon reference to the following specification taken in connection with the accompanying drawings in which:

FIGURE 1 is a vertical sectional view, somewhat diagrammatically drawn, illustrating one arrangement of a double lint cleaner in accordance with the present invention;

FIGURE 2 is a fragmentary view drawn at somewhat larger scale showing the doffing brush pertaining to the first lint cleaner and the by-pass valving associated therewith;

FIGURE 7 is a fragmentary view of a cleaner constructed generally according to the modification of FIGURES 4 thru 6 but somewhat modified to provide for greater compactness;

FIGURE 8 is a sectional view indicated by line 8—8 on FIGURE 4 showing the manner in which vertical joints between side wall members of the cleaner are interconnected;

FIGURE 9 is a sectional view indicated by line 9—9 on FIGURE 4 showing the manner in which horizontal joints between side wall members of the cleaner are interconnected;

Figure 3:
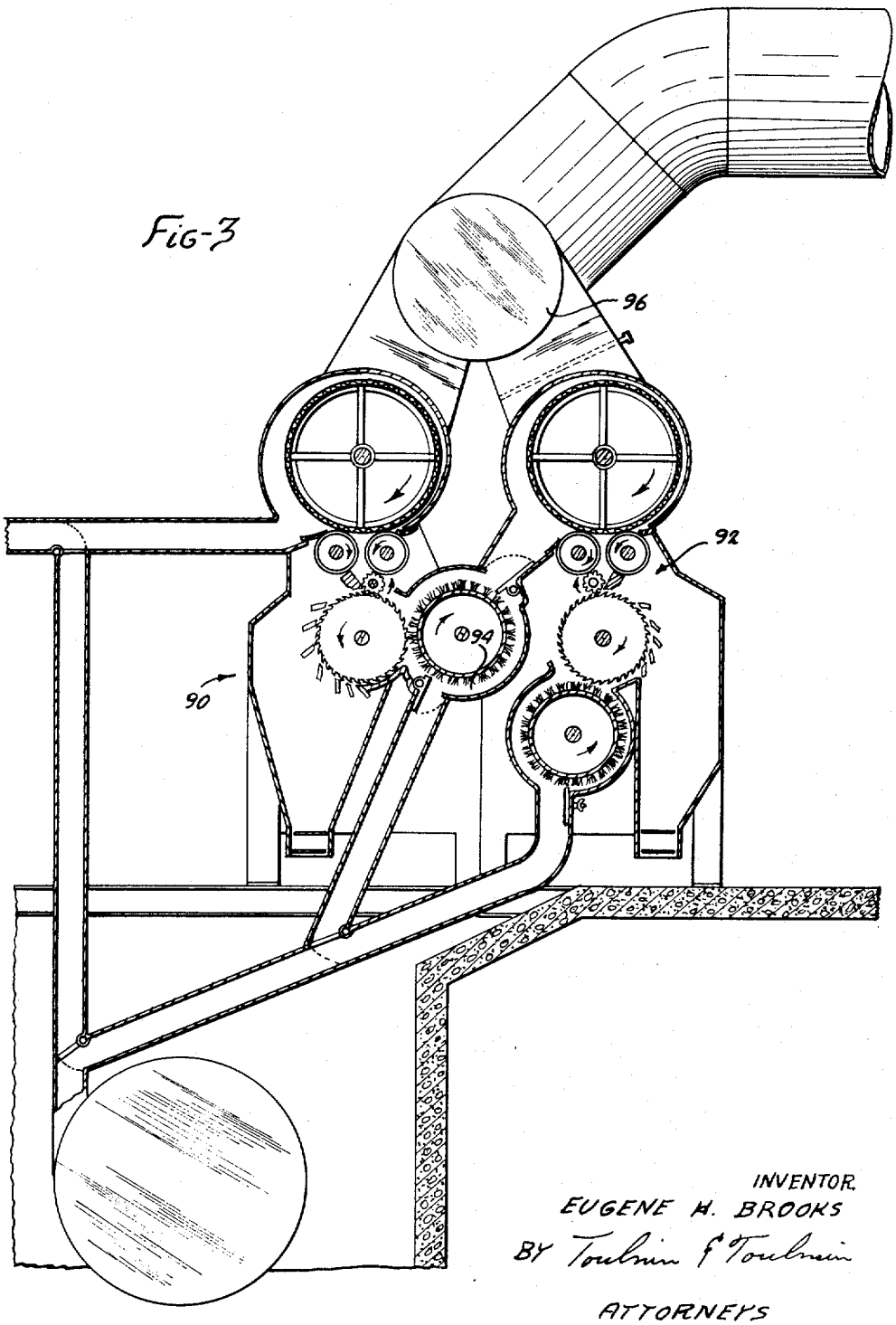
FIGURE 3 is a view similar to FIGURE 1 but showing a slightly modified form of double cleaner in which the two cleaners are so arranged as to minimize the space required for their installation.

Referring to the drawings somewhat more in detail, 10 indicates a flue coming from a gin or from a battery of gins. The lint cotton is destined eventually to be delivered to a lateral main flue 12 which advantageously runs beneath the floor level.

For those instances wherein both cleaners are to be by-passed there is a branch flue 14 leading from flue 10 to flue 12 and the passage of lint cotton through the flue 14 is under the control of valves 16 and 18. Normally, the valves 16 and 18 are adjusted as illustrated in FIGURE 1 so that the flue 14 is closed off, but opening of both of the valves will permit all of the lint cotton in flue 10 to be delivered directly to lateral flue 12.

Flue 10 normally communicates via duct 20 with the condenser chamber 22 of a first lint cleaner and within which chamber there is a rotary foraminous condenser cylinder 24, the interior of which is evacuated via a duct 26 having a fan 28 therein. As is well known, the lint delivered to the condensing chamber is airborne, and in order to obtain a compact bat of lint, which can be handled in cleaning instrumentalities, the air is withdrawn from the lint cotton through the foraminous cylinder 24.

The lint cotton collects on the surface of the cylinder 24 in a more or less air free condition and as the cylinder rotates in the direction of the arrow thereon, a pair of doffing rolls 30 remove the cotton and supply it to a feeding station 32 consisting of a bar and a rotating feed roller which delivers the lint cotton at controlled speed to a saw cylinder 34, also rotating in the direction indicated by the arrow thereon.

The lint cotton which is picked up by the saw cylinder is whipped about the cleaner bars 36 and is thus divested of most of the leaves and other foreign matter entrained in the lint cotton. This foreign matter falls downwardly in the trash chamber 38 and may be conveyed from the trash chamber as by means of a conveyor mechanism 40 which may be a belt, as illustrated, or which may consist of a screw conveyor or the like.

The lint cotton on the saw cylinder is removed from the saw cylinder after the lint cotton has been carried past the cleaner bars by the doffing brush 42 which rotates in the direction indicated by the arrow thereon and at a surface speed somewhat higher than the speed of the saw cylinder. This lint cotton is conveyed on the doffing brush around to either one of two ducts. A first duct 44 leads to a second cleaning mechanism similar to the first cleaning mechanism and a second duct 46 leads to a duct 48 that connects with the lateral main lint flue 12 previously referred to.

At the inlet end of duct 44 is a valve 50 of novel construction which can be moved from a first position where it closes off the inlet end of duct 44 to a second position where it opens the inlet end of duct 44 while at the same time it serves as a windboard or cutoff to remove the lint cotton from the brush 42 and to direct it into the duct 44.

The valve 50 is illustrated at somewhat enlarged scale in FIGURE 2 and it will be seen that it is pivoted at 52 at an intermediate point so that one end 54 thereof is so positioned when the valve is open, to act as a cutoff thus providing for complete removal of the lint cotton from the doffing brush 42 and diversion thereof into the duct 44. When the valve is closed it will be apparent that it offers no resistance to movement of the lint cotton with the doffing brush around to the inlet of the duct 46.

Lint cotton that is diverted into duct 44 is conveyed to a condenser chamber 56 which is the same as condenser chamber 22 and within chamber 56 is the condenser cylinder 58 associated with which are doffing rolls 60 that deliver the desired cotton to a feeding station 62 and then to a saw cylinder 64 which, as will be seen rotates in direction opposite to the direction of rotation of saw cylinder 34. After the lint cotton on saw cylinder 64 is carried past the cleaner bars 66 it is picked up by the doffing brush 68 and conveyed to the inlet of a continuation of duct 48, which has been referred to previously. The end of duct 48 adjacent to doffing brush 68, is provided with a cutoff member 70 to assist in divesting doffing brush 68 of the lint cotton thereon.

When valve 50, referred to above, is in its closed position, the lint cotton on doffing brush 42 will pass around with the brush to the inlet end of duct 46. The inlet end of duct 46 is provided with a valve 72 which is substantially identical in structure to valve 50. Valve 72, as will be seen in FIGURE 2 is also pivoted at an intermediate point 74 so that when the valve is opened the short end 76 of the valve acts as a cut off to assist in divesting the doffing brush 42 of lint cotton and to divert the lint cotton thus removed from the doffing brush into duct 46. The lower end of the duct 46 is provided with a valve 77 which is closed when valve 72 is closed. These valves may be interconnected for simultaneous operation, if so desired, and, further, valve 50 may also be connected with valves 72 and 77 so that the valves can all be moved between their two operative positions at one time.

The second cleaner in the FIGURE 1 arrangement is preferably provided with its own duct 78 connected with the interior of condenser cylinder 58 and its own fan 80 so that when the second cleaner is not used the fan 80 can be halted, thus representing a conservation of power.

In the FIGURE 1 arrangement, the first cleaner, with the exception of the feed duct 20 is rotated 180° from the position it usually occupies when only a single cleaner is employed. The extreme compactness of the present invention is partly obtained by turning this first cleaner to the position illustrated in FIGURE 1 while the second cleaner is left in its normal position. This leads to an arrangement so compact that it adapts itself well to existing installations thus permitting double lint cleaning to be provided on existing gins where otherwise there would not be sufficient space.

A somewhat modified arrangement is illustrated in FIGURE 3 wherein there is a first cleaner indicated generally at 90 and a second cleaner generally indicated at 92. These cleaners are arranged and cooperate in the same manner as described in connection with the first modification but it will be noted that the doffing brush chamber 94 of FIGURE 3 is in a somewhat different position than the doffing brush chamber in FIGURE 1 and is actually somewhat nested within the second cleaner thereby leading to even greater economy of space and permitting installation of the double gin arrangement in even less space than the structure in FIGURE 1.

The FIGURE 3 structure also employs a single exhaust duct 96 for removing air from both of the condenser cylinders.

The branch leading from the exhaust duct 96 to the condenser cylinder of the second cleaner could be provided with a cutoff valve if so desired so that when only one cleaner was in operation, namely, the first cleaner, the second cleaner could be rendered completely idle.

In FIGURES 4 thru 7 there are shown arrangements whereby existing single cleaners can be modified to provide for double cleaning.

Figure 4:
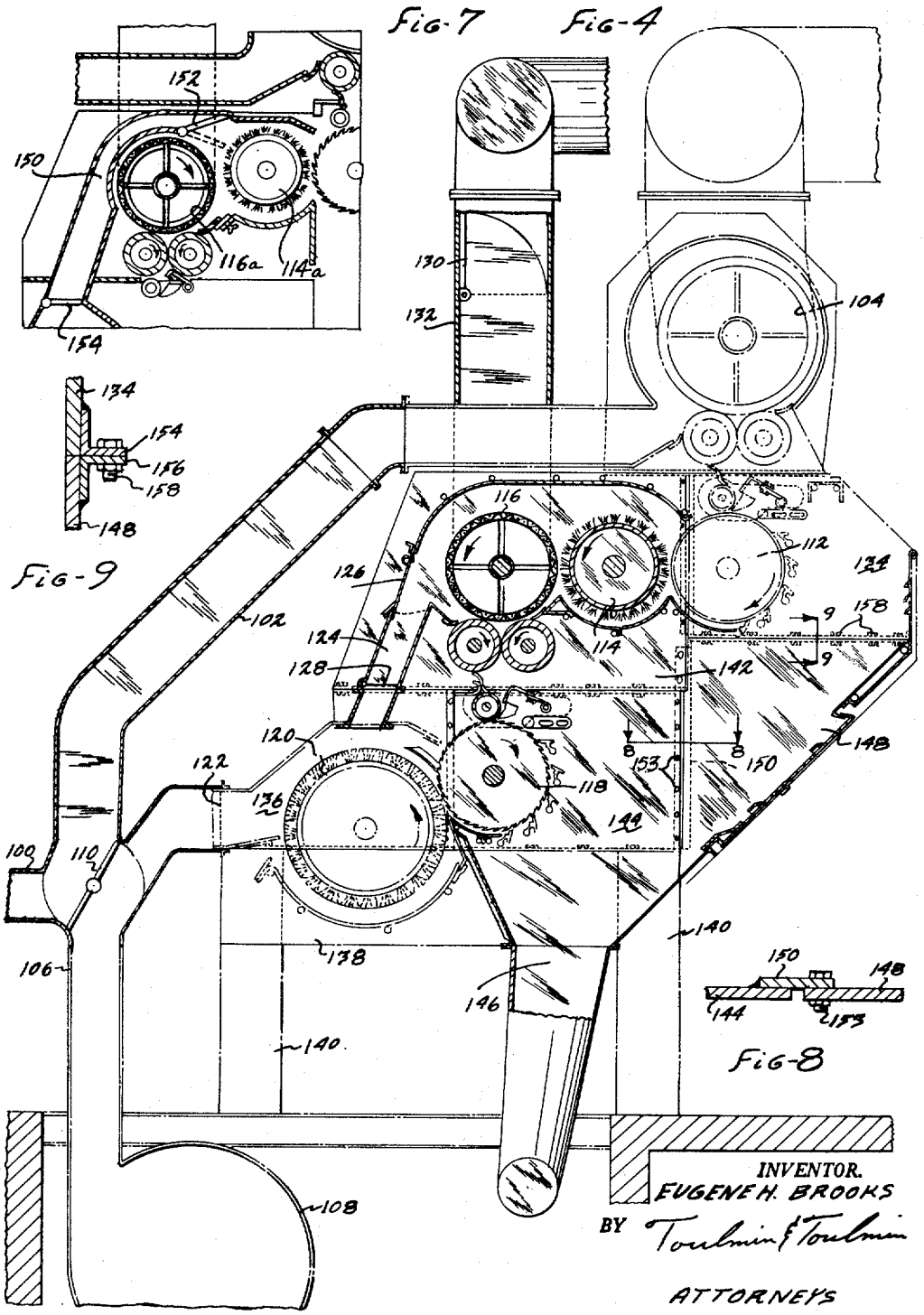
FIGURE 4 is a vertical sectional view similar to FIGURE 3 but showing a modified arrangement of a cleaner according to the present invention.
Figure 5:
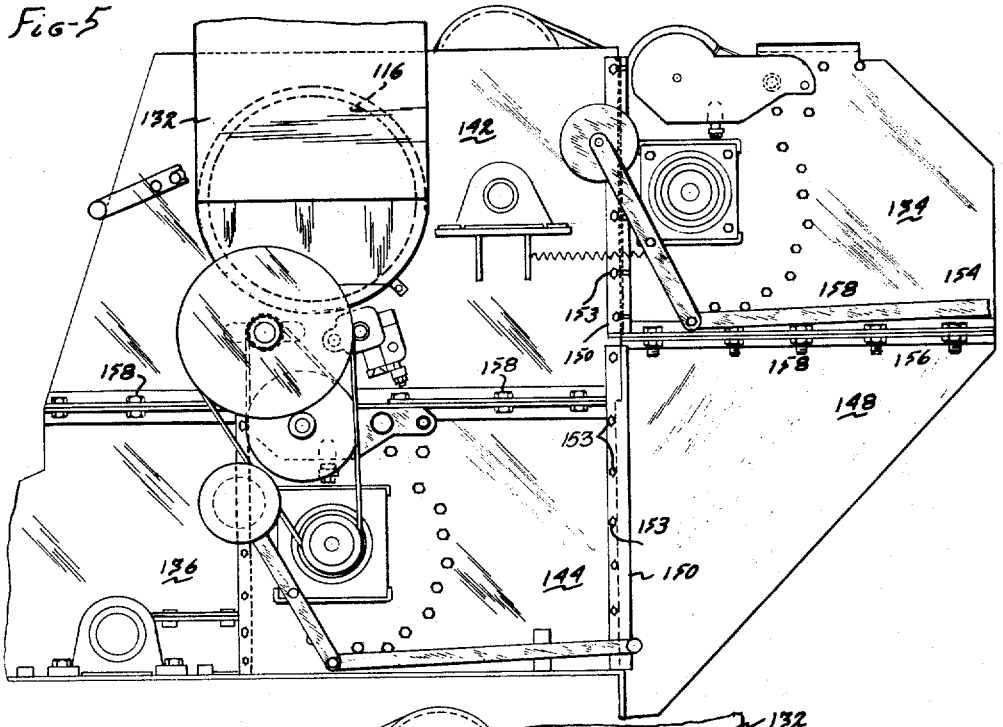
FIGURE 5 is a fragmentary side elevational view of the cleaner of FIGURE 4 looking from one side.
Figure 6:
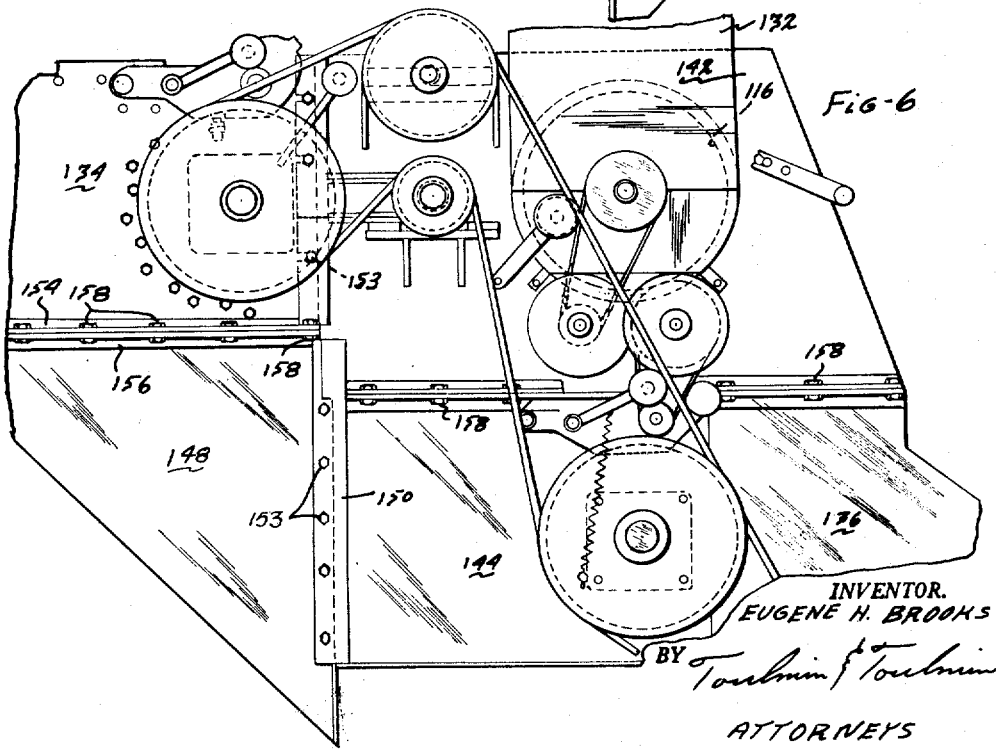
FIGURE 6 is a similar side elevational view looking in from the opposite side of the cleaner of FIGURE 5.

In FIGURES 4, 5, and 6 there is shown one modification wherein the incoming flue is indicated at 100. This flue is adapted for communicating with a flue 102 leading to condenser cylinder 104 of the first cleaning stage or with a flue 106 leading to the main flue 108 under the floor.

Valve 110 is adjustable for selectively connecting flue 100 with either flues 102 or 106. The condenser cylinder 104 supplies the lint cotton to the saw cylinder 112 of the first cleaning stage in a conventional manner.

This saw cylinder is a portion of the original single cleaner modified according to this invention.

The saw cylinder delivers clean cotton to a doffing brush 114 from which the cotton is transferred to a second condenser drum 116. This condenser drum delivers the lint cotton to a second saw cylinder 118 from which the cleaned cotton is removed by a second doffing brush 120 and which is the doffing brush forming a part of the original single cleaner.

From doffing brush 120 the doubly cleaned lint cotton passes through a short flue 122 to the upper end of flue 106 and thence to main flue 108.

When only single cleaning of the cotton is desired a short by-pass flue 124 is availed of by opening valve 126 at the upper end thereof and also opening valve 128 at the lower end thereof. When these valves are open the cotton, which has been cleaned once, passes from condenser cylinder 116 down flue 124 and then around the upper left-hand position of the doffing brush 120 to flue 122 thus by-passing the second cleaning stage.

When the cotton is thus by-passed, valve 130 in exhaust flue 132 is closed or else the fan connected with that flue is halted so that the cotton does not cling to condenser cylinder 116.

The structure of FIGURE 4 [as] *is* arrived at by modifying a single cleaner by inserting therein in an auxiliary housing means, the devices for accomplishing the second cleaning. The particular manner in which a single cleaner can be modified in this manner will be apparent upon reference to FIGURES 4 through 6, 10 and 11.

Figure 10:
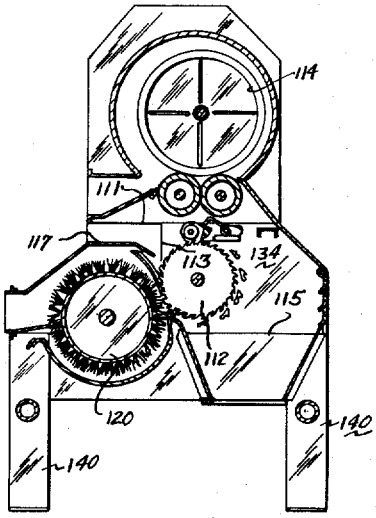
FIGURE 10 shows a vertical sectional view through a single lint cleaner prior to modification to make a double cleaner of it.

FIGURE 10 shows in cross section a single lint cleaner of the type that is to be modified according to the modification of FIGURES 4 through 6 to provide for double lint cleaning.

Figure 11:
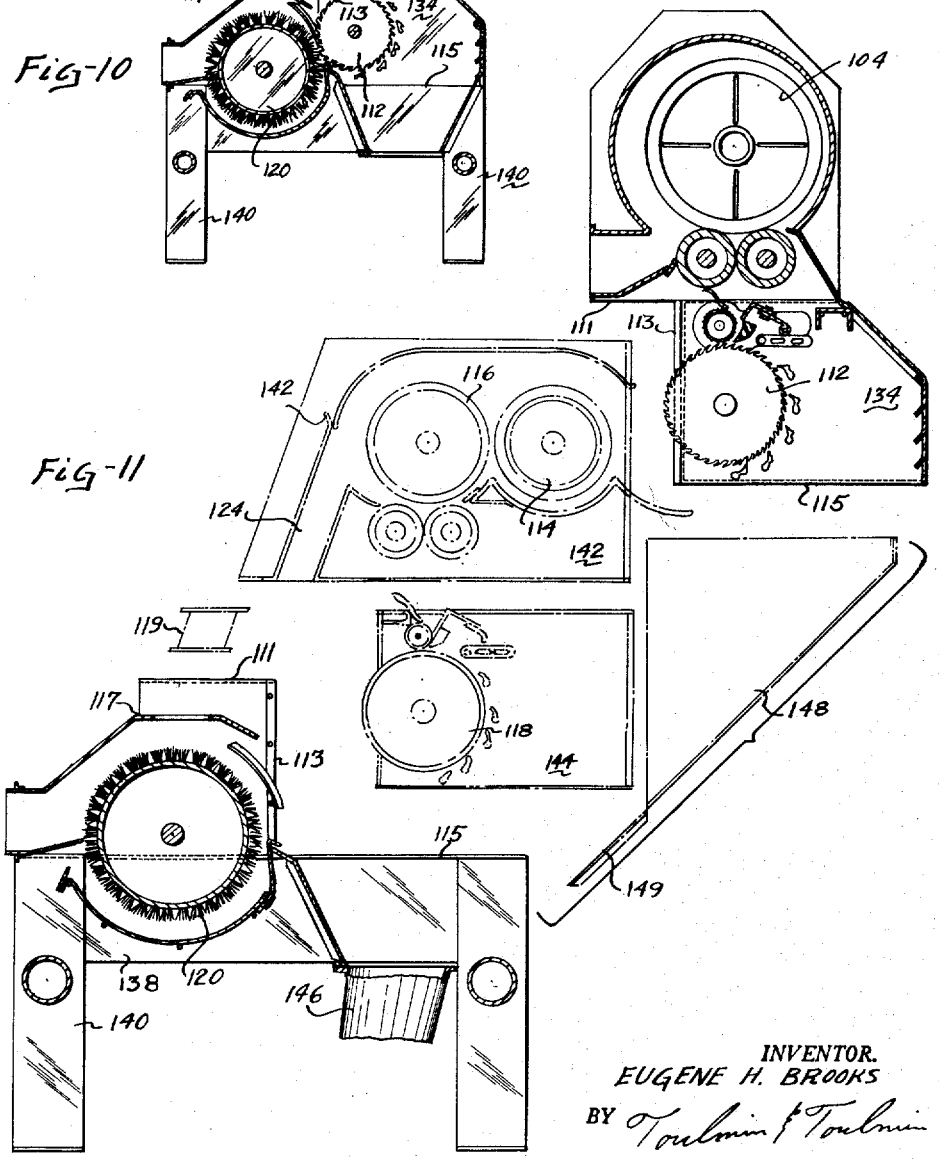
FIGURE 11 shows the same lint cleaner in section with the separated parts thereof in spaced relation and with the auxiliary housing means portion to be added to the cleaner interposed therebetween.

The housing of the cleaner is separated along the line 111, 113, 115 so that one portion of the separated cleaner contains the condenser cylinder and the feed rolls pertaining thereto and the saw cylinder 112 while the doffing brush 120 is contained in the other portion of the cleaner. In FIGURE 11 it will be seen that these portions are separated so that the side wall portion at 134 pertaining to the condenser cylinder and saw cylinder is separated from the side wall portion 136 pertaining to the doffing brush 120. The last mentioned side wall portion is attached to a base portion 138 that includes the supporting legs 140.

After the aforementioned parts of the original cleaner are separted there can be inserted into the space between the separated portions a unit consisting of an auxiliary housing means containing the instrumentalities necessary for accomplishing the second cleaning. This auxiliary housing means comprises a first side wall portion 142 pertaining to doffing brush 114 the function of which replaces the function of the original doffing brush 120. Also included in this portion is the condenser cylinder 116 and the feed rolls and other devices pertaining thereto which operate to remove the lint cotton from the condenser cylinder 116 and to deliver it to the saw cylinder 118.

The saw cylinder 118 is contained between another pair of side wall portions 144 forming a part of the auxiliary housing means and depending from these side wall portions are the duct means 146 providing the chute for trash that is removed from the cotton as it passes about the saw cylinder 118. Another added side wall portion 148 and a corresponding back wall portion complete the auxiliary housing means and extend up to the bottom side of the side wall portions 134 pertaining to the original portion of the cleaner for receiving trash from the saw cylinder 112.

On account of the somewhat different angle of inclination of the back edges of the side wall portions 148, a short back wall portion 149 is provided for connection of the trash chute 146 to the lower edge of the back wall portion extending between side wall portion 144.

It will be evident from FIGURES 10 and 11 that the side wall portions of the auxiliary housing means that are to be inserted between the original separated portions of the single lint cleaner are so arranged as to mate exactly with the surfaces 111, 113, and 115 which are marked in FIGURE 11 and which correspond to the line 111, 113, and 115 of FIGURE 10 where the original side wall portions of the single lint cleaner are separated.

The side wall portions, of course, include the side panels of both sides of the cleaner and the various rotating devices of the cleaner are supported between these walls or these panels, together with the various dividing walls and stationary parts, and the side panels also support the bearings for the shafts on which the rolls, drums, and cylinders are mounted.

Since the original side walls or side panels of the single lint cleaner and the side walls or panels of the auxiliary housing means added thereto are arranged in coplanar alignment, any suitable manner of interconnecting the panels at their adjoining edges can be employed. One such arrangement is illustrated in FIGURE 8 wherein side portion 144 is connected to side wall portion 148 by a bar or strip 150 welded to one thereof and bolted to the other by bolt means 153.

In other cases, particularly where there is vertical loading to sustain, a connection according to FIGURE 9 may be employed. In this figure, the lower edge of side wall portion 134 carries an angle 154 affixed thereto and the upper edge of the side wall portion 148 of the auxiliary housing means therebeneath carries an angle 156 affixed thereto. Bolt means 158 bolt the angles together in load transmitting relation. A connection of this nature is preferred for the horizontal joints whereas the connection of FIGURE 8 is suitable for the interconnection of vertical joints.

Contained between the auxiliary housing means side walls 142 containing the doffing brush 114 and the condenser cylinder 116 is the duct 124 and the valves 126 and 128 pertaining thereto. There is also added a short duct section 119 adapted, when the cleaner is assembled, to communicate with duct 124. This duct section is added by connecting it to top wall 117 by forming an opening in the wall portion 117 which, as will be seen in FIGURE 10, is a continuous member in a single lint cleaner.

It will be seen that the present invention provides an arrangement whereby a substantially single or unit lint cleaner can be modified to convert it into a structure for selective single or double cleaning of the cotton.

In the modification of FIGURE 7 a cleaner substantially identical with the modification of FIGURES 4 through 6 is illustrated and the same numerals where they apply to the same parts are employed with the addition of a subscript "a." In FIGURE 7, however, the condenser cylinder 116a rotates in a clockwise direction rather than in a counterclockwise direction so that when the second cleaning stage is to be by-passed an auxiliary by-pass chute 150 extending about the periphery of cylinder 116a can be availed of by opening the upper valve 152 therein and the lower valve 154. The upper valve 152 it will be noted acts as a windboard to assist in stripping the lint cotton for doffing brush 114a.

From the foregoing it will be appreciated that the present invention provides means for the single or double cleaning of lint cotton and with an unusually compact and easily regulated and controlled structure. One of the features of the present invention resides in the valves associated with the doffing brush of the first cleaner and which valves are not only duct controlling valves but also serve as windboards or cutoffs to assist in divesting the doffing brush of its lint cotton at the entrances of the proper ducts, either the one leading to the second cleaner, or the one which delivers the lint cotton to the lateral main line flue 12.

The arrangement of the present invention is relatively inexpensive and will permit the advantages of double lint cotton cleaning to be obtained in establishments where this cannot now be had on account of the space requirements.

*In every case where the lint cotton moves from one position to another, except where the lint cotton is carried on a condenser cylinder, a saw cylinder, or a doffing brush, the lint cotton is air borne and is carried by and with the air from a region of higher pressure to a region of lower pressure.*

*At various predetermined places about the casing of the device, openings are provided for admitting air to establish the streams of air which will move from a higher pressure region to a lower pressure region and thus accomplish the aforementioned conveying of the lint cotton.*

*This manner of conveying lint cotton is what is usually employed in devices of the nature disclosed.*

It will be understood that this invention is susceptible to modification in order to adapt it to different usages and conditions; and, accordingly, it is desired to comprehend such modifications with this invention as may fall within the scope of the appended claims.

I claim:

1. In an arrangement for cleaning fibers such as lint cotton; a first cleaner having a doffing brush for the discharge of the fiber cleaned in the first cleaner, a flue for receiving cleaned fiber, a second cleaner having an inlet, ducts leading from spaced points about the periphery of said doffing brush to said flue and to the inlet of said second cleaner, respectively, and a valve at the brush end of each of said duct, each valve being movable between duct open and duct closed positions and each valve in its duct open position having an edge disposed closely adjacent the periphery of the said brush so as to serve as a cut-off to remove fiber therefrom.

2. In an arrangement for cleaning fibers such as lint cotton; a first cleaner having a doffing brush for the discharge of the fiber cleaned in the first cleaner, a flue for receiving cleaned fiber, a second cleaner having an inlet, ducts leading from spaced points about the periphery of said doffing brush to said flue and to the inlet of said second cleaner, respectively, and a valve at the brush end of each said duct, each valve being pivoted to its pertaining duct on an axis closer to one edge of the valve than to the other edge thereof and being movable between duct open and duct closed positions and each valve being pivotally mounted at one side of its pertaining duct at a point along the valve spaced from one end, said point being so located on the valve that when the valve is open the longer portion thereof is disposed in the duct and the shorter portion thereof is disposed adjacent the periphery of said brush so as to operate as a cut-off to remove the fibers from the brush and direct them into the duct.

3. In an arrangement for the selective double cleaning of lint cotton; first and second cleaners, each said cleaner having an inlet and an outlet, a first flue for incoming dirty lint cotton and a second flue for outgoing clean lint cotton, and ducts between said flues and cleaners for conveying the lint cotton through the first cleaner only or through both cleaners in succession, said first cleaner having a doffing brush for the discharge of lint cotton therefrom, said ducts including ducts leading from spaced points about the periphery of said brush to the inlet of said second cleaner and to said second flue, a flat valve plate at the brush end of each of said last mentioned ducts, each valve plate being pivoted to its duct at the side thereof toward which the brush is moving, and the pivot for each valve plate being located inwardly from one side of the valve plate to provide for a long side and a short side, each valve plate in one position closing its duct and in another position having its long side located in the duct and the edge of its short side located adjacent the periphery of the brush to direct the lint cotton therefrom into the duct.

4. In an arrangement for the selective double cleaning of lint cotton; a first cleaner having a doffing brush for the discharge of lint cotton therefrom, a housing enclosing the brush, a second cleaner having an inlet, a first duct leading from one point on the housing to the inlet of the second cleaner, a second duct leading from a point on the housing spaced from said one point to a discharge flue, a flat valve plate at the brush end of each duct, each valve plate being pivoted to the side of its duct toward which the brush is moving and inwardly from one side of the valve plate *to provide the valve plate with a short side and a long side on respectively opposite sides of the pivot axis therefor* so that in one position the *long side of the* valve plate closes the duct and in another position the *long side of the* valve plate opens the duct while the short side thereof closes the space between the housing and the periphery of the brush.

5. In a lint cotton cleaner; a doffing brush for discharging lint cotton from the cleaner, a housing surrounding the doffing brush, an opening in the wall of the housing, and a flat valve plate pivoted to one side of the opening on an axis inwardly from one side of the valve plate, said valve plate having one position where it closes said opening and forms a part of the housing so the brush will carry lint cotton past the opening, said valve plate having a second position where the opening is open, said axis being so located that in its second position the valve plate extends to the periphery of the brush and serves as a cut-off to direct lint cotton therefrom into said opening.

6. In a lint cotton cleaner, a housing having side walls, cleaning instrumentalities supported by said side walls making up a single lint cleaner, said side walls being divided so the housing consists of first and second portions each containing some of said instrumentalities, said portions being adapted for being placed in spaced relation, an auxiliary housing means adapted for being inserted in the space between the first and second portions when so spaced, said auxiliary housing means having side walls adapted for connection with the side walls of the said first and second portions, said auxiliary housing means containing instrumentalities cooperating with the said instrumentalities in the first and second portions to make up two serially connected cleaners, and a by-pass duct having control valve means adjustable for selectively by-passing one of said serially connected cleaners.

7. In a lint cotton cleaner; a housing having side walls, said side walls being divided so the housing consists of first and second portions, the said first portion of the housing containing a condenser drum, a saw cylinder, and feed means for delivering lint cotton from the condenser drum to the saw cylinder, said second portion containing a doffing brush for removing the lint cotton from the saw cylinder, said first and second housing portions being adapted for being placed in spaced relation so said doffing brush is remote from the saw cylinder, and auxiliary housing means adapted for being inserted between the said first and second housing portions when so spaced, said auxiliary housing means having side walls adapted for being connected with the side walls of the said first and second portions, said auxiliary housing means having therein a doffing brush positioned to cooperate with the saw cylinder of the said first housing portion, a condenser drum for receiving lint cotton from the last mentioned doffing brush, a saw cylinder and feed means to deliver the lint cotton from the last mentioned condenser drum to the saw cylinder, and the saw cylinder in the auxiliary housing means being positioned in operative relation with the doffing brush in the said second housing portion thereby making up two lint cleaners serially connected, and said auxiliary housing means having therein a by-pass duct having valve means selectively adjustable for by-passing one of said serially connected cleaners.

8. In a lint cotton cleaner; a housing having side walls, said side walls being divided so the housing consists of first and second portions, the said first portion of the housing containing a condenser drum, a saw cylinder, and feed means for delivering lint cotton from the condenser drum to the saw cylinder, said second portion containing a doffing brush for removing the lint cotton from the saw cylinder, said first and second housing portions being adapted for being placed in spaced relation so said doffing brush is remote from the saw cylinder, and auxiliary housing means adapted for being inserted between the said first and second housing portions when so spaced, said auxiliary housing means having side walls adapted for being connected with the side walls of the said first and second portions, said auxiliary housing means having therein a doffing brush positioned to cooperate with the saw cylinder of the said first housing portion, a condenser drum for receiving lint cotton from the last mentioned doffing brush, a saw cylinder and feed means to deliver the lint cotton from the last mentioned condenser drum to the saw cylinder, and the saw cylinder in the auxiliary housing means being positioned in operative relation with the doffing brush in the said second housing portion thereby making up two lint cleaners serially connected, and said auxiliary housing means having therein a by-pass duct having valve means selectively adjustable for by-passing one of said serially connected cleaners, the side walls of said first and second housing portions being connected along vertical and horizontal lines, the side walls of said housing means also having vertical and horizontal portions adapted for being joined to the vertical and horizontal portions of the side walls of the first and second housing portions.

9. In a lint cotton cleaner; a housing having side walls, said side walls being divided so the housing consists of first and second portions, the said first portion of the housing containing a condenser drum, a saw cylinder, and feed means for delivering lint cotton from the condenser drum to the saw cylinder, said second portion containing a doffing brush for removing the lint cotton from the saw cylinder, said first and second housing portions being adapted for being placed in spaced relation so said doffing brush is remote from the saw cylinder, and auxiliary housing means adapted for being inserted between the said first and second housing portions when so spaced, said auxiliary housing means having side walls adapted for being connected with the side walls of the said first and second portions, said auxiliary housing means having therein a doffing brush positioned to cooperate with the saw cylinder of the said first housing portion, a condenser drum for receiving lint cotton from the last mentioned doffing brush, a saw cylinder and feed means to deliver the lint cotton from the last mentioned condenser drum to the saw cylinder, and the saw cylinder in the auxiliary housing means being positioned in operative relation with the doffing brush in the said second housing portion thereby making up two lint cleaners serially connected, and said auxiliary housing means having therein a by-pass duct having valve means selectively adjustable for by-passing one of said serially connected cleaners, the side wall of said first and second housing portions being connected along vertical and horizontal lines, the side walls of said housing means also having vertical and horizontal portions adapted for being joined to the vertical and horizontal portions of the side walls of the first and second housing portions, and at least the horizontal joints between the side walls of said first and second portions and said housing means being effected by members rigidly attached to said side walls and interconnected so as to transmit loads therebetween.

*10. By-pass for a two stage lint cleaner comprising; first and second cleaning stages each having a condenser cylinder and air exhaust means for attracting air borne lint thereto and rotatably mounted doffing brush constructed and arranged to receive lint from said condenser cylinder, first duct means adapted to receive lint from the doffing brush of said first stage, lint discharge duct means adapted to receive the lint from the doffing brush of said second stage, said first duct means also being adapted to transfer lint to said second stage for additional cleaning and to transfer lint to said discharge duct means, and selectively operable valve means cooperable with said first duct means and having a first position for transferring said lint from the said doffing brush of said first cleaning stage to said discharge duct means and said valve means also having a second position for transferring the lint from the doffing brush of said first stage to said second cleaning stage, the pertaining air exhaust means of said second cleaning stage being inoperative when said valve means are in said first operative position.*

*11. A by-pass for a two stage lint cleaner comprising; first and second cleaning stages each having a condenser cylinder and air exhaust means for attracting air borne lint thereto and a rotatably mounted doffing brush constructed and arranged to receive lint from said condenser cylinder, the doffing brush of the first stage and the condenser cylinder of the second stage being partially surrounded by a common housing, lint discharge duct means adapted to receive the lint from the doffing brush of said second stage and comprising a housing portion partially enveloping said doffing brush of said second cleaning stage, by-pass duct means adapted to carry lint directly from said common housing to said lint discharge duct means, said common housing being adapted to transfer lint to said second stage for additional cleaning and to transfer lint to said by-pass duct means, and selectively operable valve means cooperable with said by-pass duct means and said common housing and having a first position for transferring said lint from said first cleaning stage to said discharge duct means in the area of said housing portion, said valve means also having a second position for transferring the lint from said first stage to said second cleaning stage, and valve means associated with the air exhaust means of said second cleaning stage to close off the air exhaust means to the pertaining condenser cylinder thereby permitting the lint to travel thereover and through said by-pass duct means to said lint discharge duct in the area of said housing portion.*

*12. A lint cleaner for fibers such as cotton fibers comprising; first and second cleaning stages each having a condenser drum, a saw cylinder, feed means for delivering lint cotton from the condenser drum to the saw cylinder and rotatably mounted doffiing means to remove the lint cotton from said saw cylinder, air exhaust means connected with each said condenser drum for attracting air borne lint thereto, a lint supply duct adapted to deliver lint to said first cleaning stage, first duct means adapted to receive the lint from the doffing means of said first cleaning stage, lint discharge duct means adapted to receive the lint from the doffing means of said second stage, said first duct means also being adapted to transfer lint to said second stage for additional cleaning and to transfer lint to said discharge duct means, selectively operable valve means cooperable with said first duct means and having a first position for transferring said lint from the said doffing means of said first cleaning stage to said discharge duct means and said valve means also having a second position for transferring the lint from the doffing means of said first stage to said second cleaning stage, said air exhaust means of said second cleaning stage being inoperative when said valve means are in said first position.*

*13. A lint cleaner for fibers such as cotton comprising; first and second cleaning stages each having a condenser drum, a saw cylinder, means for delivering lint cotton from the condenser drum to the saw cylinder and rotatably mounted doffing means for removing the lint cotton from the saw cylinder, said condenser drums of said cleaning stages having axes being in spaced parallel relationship and lying in an approximate horizontal plane, said doffing means for said first stage being mounted slightly below and between said condenser durms, air exhaust means connected with each said condenser drum for attracting air borne lint thereto, a lint supply duct adapted to deliver lint to said first cleaning stage, first duct means adapted to receive the lint from the doffing means of said first cleaning stage, lint discharge duct means adapted to receive the line from the doffing means of said second stage, said first duct means also being adapted to transfer lint to said second stage for additional cleaning and to transfer lint to said discharge duct means, selectively operable valve means cooperable with said first duct means and having a first position for transferring said lint from the said doffing means of said first cleaning stage to said discharge duct means and said valve means also having a second position for transferring the lint from the doffing means of said first stage to said second cleaning stage, said air exhaust means of said second cleaning stage being inoperative when said valve means are in said first position.*

*14. A lint cleaner for fibers such as cotton comprising; first and second cleaning stages each having a condenser drum, a saw cylinder, means for delivering lint cotton from the condenser drum to the saw cylinder and rotatably mounted doffing means for removing the lint cotton from the saw cylinder, said saw cylinder of said first cleaning stage and condenser drum of said second cleaning stage having axes being in spaced parallel relationship and lying in an approximate horizontal plane, said doffing means for said first stage having an axis lying in the same plane as said axes and mounted therebetween, said first stage doffing means and said second stage condenser drum being partially surrounded by a common housing, air ex-*

*haust means connected with each said condenser drum for attracting air borne lint thereto, lint discharge duct means adapted to receive the lint from the doffing means of said second stage and comprising a housing portion partially enveloping said doffing means of said second cleaning stage, by-pass duct means adapted to carry lint directly from said common housing to said lint discharge duct means, said common housing being adapted to transfer lint to said second stage for additional cleaning or to transfer lint to said by-pass duct means, and selectively operable valve means cooperable with said by-pass duct means and said common housing and having a first position for transferring said lint from said first cleaning stage to said discharge duct means in the area of said housing portion, said valve means also having a second position for transferring the lint from said first stage to said second cleaning stage, and valve means associated with the air exhaust means of said second cleaning stage to close off*

*the air exhaust means to the pertaining condenser cylinder thereby permitting the lint to travel thereover and through said by-pass duct means to said lint discharge duct in the area of said housing portion.*

References Cited by the Examiner

The following references, cited by the Examiner, are of record in the patented file of this patent or the original patent.

UNITED STATES PATENTS

| | | | |
|---|---|---|---|
| 1,538,244 | 5/25 | Hopkins | 19—205 X |
| 1,614,624 | 1/27 | Medders | 19—38 |
| 1,630,638 | 5/27 | Streun | 19—36 |
| 1,714,953 | 5/29 | Hancock | 19—38 |
| 1,721,932 | 7/29 | Streun | 19—37 |
| 2,898,636 | 8/59 | Wallace | 19—37 |

DONALD W. PARKER, *Primary Examiner.*